Patented Nov. 8, 1932

1,886,775

UNITED STATES PATENT OFFICE

GEORGES EMMANUEL ZELGER, OF MONTREUIL, FRANCE, ASSIGNOR, BY MESNE ASSIGNMENTS, TO DU PONT FILM MANUFACTURING CORPORATION, OF WILMINGTON, DELAWARE, A CORPORATION OF DELAWARE

PLASTIC CELLULOSE COMPOUND

No Drawing. Application filed February 6, 1925, Serial No. 7,242, and in France December 29, 1924.

The present invention relates to articles of new manufacture, analogous to celluloid, one of the constituents of which is a derivative of cellulose of the class usually employed in the manufacture of threads, filaments, plates, films, varnishes, etc., and to a process for producing these articles. The said derivatives of cellulose are for instance the formate, the nitrate, the acetate, the nitro-acetate of cellulose, benzylcellulose, ethylcellulose, butylcellulose and like substances.

In order to obtain products of a plastic nature which are but slightly inflammable, I propose to incorporate with the selected cellulose derivatives one or more phospho derivatives; i. e. compounds containing one or more atoms of phosphorus which are in direct connection with one or more atoms of carbon, either free or contained in a radical; the benzene derivative of phosphorous acid is an example of a phospho derivative.

According to my invention the substances used for achieving the plastic state and the fireproof condition are the organic derivatives of phosphines; for example, the primary, secondary and tertiary phosphines, such as phenylphosphines, diphenylphosphines and triphenylphosphines; the salts of tetraphenylphosphonium and derivatives of these different bodies in which one or more hydrogen atoms of the phenyl group are replaced by other organic groups; the organic derivatives of phosphorous acid ($H_3PO_3$) in which the phosphorous is directly connected to a carbon atom, such as, the benzene derivative

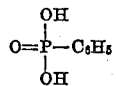

and its derivatives, such as, its diethyl ester

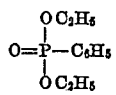

and its diphenyl ester

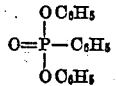

and its other alkyl and aromatic esters, its amides etc. I have found that these organic derivatives of phosphorous acid in which the phosphorus is directly connected to a carbon atom, produce the best results as regards fireproofing.

The following may be given by way of example of the use of the phospho derivatives, and, in particular, the derivatives of phosphorous acid, for the preparation of a material resembling celluloid according to my invention;

1 part of the diphenyl ester of the benzene derivative of phosphorous acid
4 parts of acetate of cellulose are dissolved in a solvent, or mixture of solvents, such as ethylacetate, acetone or the like, which are employed in sufficient quantity to confer upon the mass the desired fluidity.

The diphenyl ester of the benzene derivative of phosphorous acid may be replaced, for instance, by the diethyl ester of said benzene derivative; as a rule, I may employ the various phospho derivatives above indicated which are capable of mixing with the chosen derivative of cellulose but my invention is not limited to the substances specifically enumerated.

The plastic material thus obtained will serve as a substitute for celluloid in its various uses; it may be rolled, drawn, moulded or otherwise treated for the manufacture of threads, filaments, bands, plates, cinematographic films, cut films, coatings or varnishes and the like. In particular, it may be employed for the manufacture of a film which serves as the backing for the emulsion of cinematographic films or cut films for photographic purposes.

Diethyl or diphenyl esters of the benzene derivative of phosphorous acid in which the phosphorous is directly connected to a carbon atom, and certain methods for producing the same, are discussed in the following publications:—

Journal of the American Chemical Society, 1923 volume 45 pages 165 and 762; 1924 volume 46 pages 192 and 1005.

Articles by Michaelis in Liebig's "Annalen" volume 181 page 303; volume 293 page 225.

Article by Michaelis in Berichte der Deutschen Chemischen Gesellschaft, volume 10 page 816.

Having now described my invention, what I claim as new and desire to secure by Letters Patent is:—

1. A composition of matter comprising an organic derivative of cellulose and the diethyl ester of the acid $C_6H_5PO(OH)_2$.

2. A composition of matter comprising an organic derivative of cellulose and an ethyl ester of the acid $C_6H_5PO(OH)_2$.

3. A composition of matter comprising cellulose acetate and the diethyl ester of the acid $C_6H_5PO(OH)_2$.

4. A composition of matter comprising cellulose acetate and an ethyl ester of the acid $C_6H_5PO(OH)_2$.

5. A composition of matter comprising a cellulose derivative and the diethyl ester of the acid $C_6H_5PO(OH)_2$.

6. A composition of matter comprising a cellulose derivative and an ethyl ester of the acid $C_6H_5PO(OH)_2$.

7. A composition of matter comprising cellulose acetate and the diphenyl ester of the benzene derivative of phosphorous acid.

8. A composition of matter comprising 4 parts of cellulose acetate and 1 part of the diphenyl ester of the benzene derivative of phosphorous acid.

9. The process for the manufacture of a plastic compound which comprises dissolving 4 parts of cellulose acetate and 1 part of the diphenyl ester of the benzene derivative of phosphorous acid in a volatile solvent for the same.

10. A composition of matter comprising cellulose acetate and a substance of the group consisting of diethyl and diphenyl esters of the benzene derivative of phosphorous acid.

In testimony whereof I have signed my name to this specification.

GEORGES EMMANUEL ZELGER.